Dec. 25, 1928.

H. I. SHIRE 1,696,334

METHOD OF TESTING STORAGE BATTERIES

Original Filed Sept. 16, 1920   3 Sheets-Sheet 1

INVENTOR
HARRY I. SHIRE.
BY Thomas Howe
ATTORNEY

Dec. 25, 1928.

H. I. SHIRE

METHOD OF TESTING STORAGE BATTERIES 1,696,334

Original Filed Sept. 16, 1920   3 Sheets-Sheet 2

INVENTOR
HARRY I. SHIRE.
BY
Thomas Howe ATTORNEY

Dec. 25, 1928.

H. I. SHIRE 1,696,334

METHOD OF TESTING STORAGE BATTERIES

Original Filed Sept. 16, 1920    3 Sheets-Sheet 3

INVENTOR
*HARRY I. SHIRE.*
BY
*Thomas Howe* ATTORNEY

Patented Dec. 25, 1928.

1,696,334

UNITED STATES PATENT OFFICE.

HARRY I. SHIRE, OF DETROIT, MICHIGAN.

METHOD OF TESTING STORAGE BATTERIES.

Original application filed September 16, 1920, Serial No. 410,684. Divided and this application filed August 14, 1924. Serial No. 731,930.

This invention relates to methods of indicating electrical conditions, especially those relating to storage batteries.

This application is a division of my prior application Serial Number 410,684, filed September 16, 1920.

The main object of the invention is to provide a method of testing storage batteries whereby their condition may be readily, accurately and comprehensively observed. Other and ancillary objects of the invention will appear hereinafter.

In the accompanying drawings, which illustrate apparatus whereby the invention may be carried out, Fig. 1 is a front elevation of an instrument whereby the method may be carried out;

Figure 1:
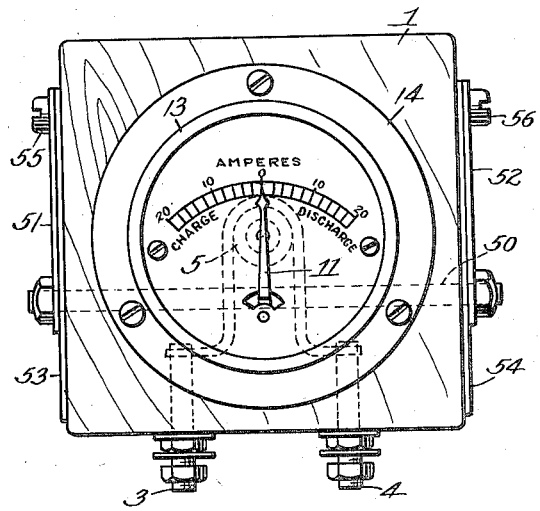
Figure 2:
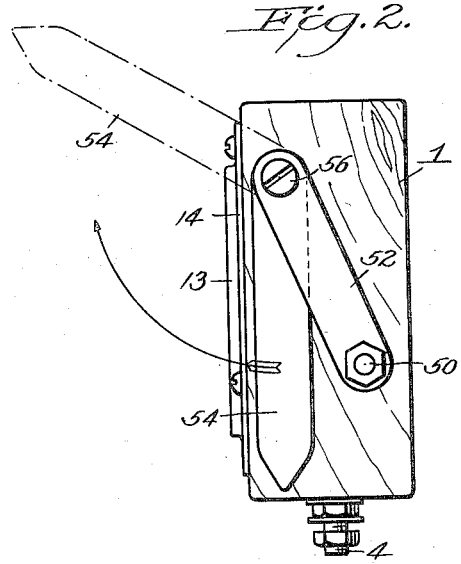
Fig. 2 is a side elevation of the said instrument.
Figure 3:
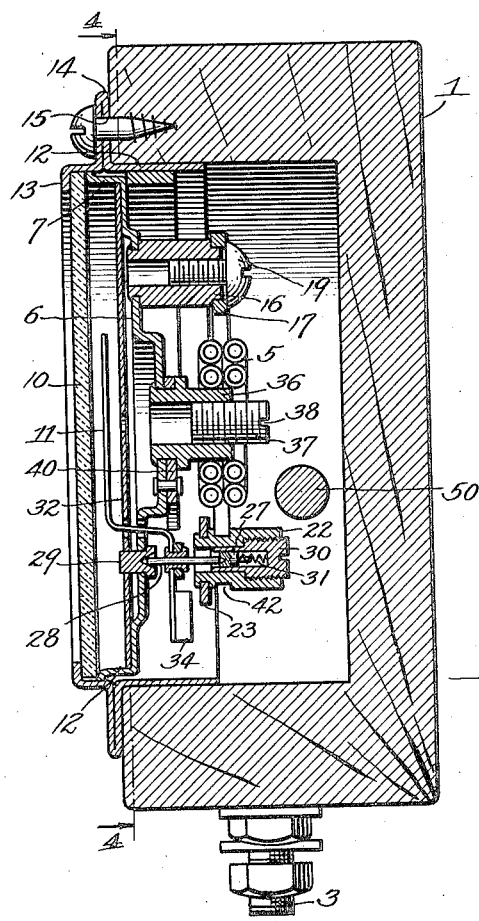
Fig. 3 is a central vertical section of the instrument on an enlarged scale.

Referring to the drawings and first to Figs. 1 to 5 inclusive, a wooden casing 1 is provided in which is contained the actuating elements of the ammeter as shown. The actuating mechanism referred to is similar to that shown and described in my prior application Serial Number 333,515, filed October 27th, 1919, except for the straight bar for carrying large currents, and the arrangement of the central current coil whereby the terminals may be brought out at the bottom of the casing, as shown, instead of at the back as in my prior application referred to. The instrument here shown comprises, terminals 3 and 4 mounted in the wooden casing so that they are insulated. The ends of an electric coil 5 having a plurality of turns are secured to the studs 3 and 4 respectively so the electrical connection with the coil may be made through the studs. The wire of the coil is insulated and it is of such size as to be self-sustaining so that the coil is supported from the studs.

A brass mechanism plate 6 has a flange 7 which bears against the glass plate 10 through which the indicator 11 is observed, this plate being held in position by means of a sleeve 12 sliding upon the inside of the casing 1 and having a flange 13 overlapping the front face of the glass plate for holding the latter in position, and also a flange 14 provided with bolt or screw holes 15 for securing the apparatus in the wooden casing.

Mounted upon a brass post 16 which is secured to the mechanism plate 6 is a permanent steel magnet 17 of the horse-shoe type. The upper end of the post 16 passes through a slot 18 of the magnet which is held in any position to which it may be adjusted by sliding it about the post 16, by means of a screw 19 tapped into the top of the post. The poles 20 and 21 of this magnet bear against a brass post 22 which is mounted in a plate 23 which in turn is mounted upon the posts 24 and 25 mounted in the mechanism plate 6. Sliding within the post 22 is a bearing 27 for the staff 28, while the other end of the staff engages with a bearing 29 secured in the mechanism plate 6. The bearing surfaces for the staff are of the usual conical type familiar in electrical meter and instrument structures.

The pressure upon the bearings may, however, be adjusted by means of the plug 30 screw-threaded into the top of the post 22, a spring 31 being interposed between the plug and the bearing 27 as shown. By screwing down on the plug and putting the spring under greater or less compression, the pressure between the bearings and the end of the spindle may be made any that is desired.

Figure 4:
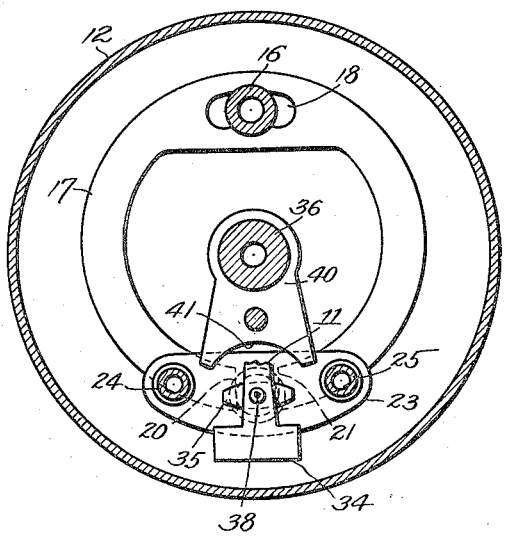
Fig. 4 is a section (with the outer casing removed) on the line 4—4 of Fig. 3.

It has been found that the operation of the instrument, so far as being dead beat and firmly holding the rotatable element is concerned, is greatly improved by making the pressure upon the bearings greater than the weight of the staff and its carried parts. Fixed upon the staff so as to turn therewith is the pointer 11 moving over the dial plate 32 and having a counter-weight portion 34 which serves to balance the indicating end about the staff. Also fixed upon the staff is the armature 35 of magnetic material mounted below the gap between the poles of the permanent magnet so as to be acted on by the flux between the poles, whereby the magnet tends to set its length of greatest diameter across the gap as shown in Fig. 4.

The coil 5 has a magnetic core comprising a sleeve 36 of magnetic material in which is screw-threaded a member 37 of magnetic material whereby the magnetic circuit of the coil may be adjusted. The rear end of this member has a slot 38 for a screw driver. The core also comprises a member 40 of good magnetic material secured to the mechanism plate and in intimate magnetic relation to the sleeve 36. This member 40 terminates in a pole piece 41 in proximity to the armature 35.

The armature and consequently the pointer 11 will take up a position which will depend upon the resultant action of the magnetism of the coil 5 and of the flux of the permanent magnet. The relative effects of the two magnetisms upon the armature may be made to vary by screwing the member 37 back and forth thereby altering the magnetic circuit of the coil 5 and consequently its effect upon the armature. It is desirable, however, that the portions of the magnetic circuit adjacent the armature, namely the pole piece, shall be in permanent relationship to the axis of the armature so that any adjustment will not effect this relationship.

By the apparatus described, the instrument can be calibrated by varying the magnetic circuit of the coil 5 as described without disturbing the relationship of the armature to the immediately adjacent parts of the magnet core.

In order to bring the needle into registry with any particular part of the dial as for instance on zero, it may be desirable to shift the angular direction of the magnetism acting upon the armature but without changing it bodily. This can be effected with the apparatus shown by loosening the screw 19 and sliding the magnet at that point in one direction or the other when the magnet will turn about the post 22, that is about the axis of the staff, the ends or poles of the permanent magnet being entered within the circumferential groove 42 in the post 22 and bearing against the post at the base of the groove so as to turn thereon.

It is desired, however, that the cross-section of the permanent magnet shall not be decreased by reason of the slot 18 being in it and it is accordingly thickened at this point so as to have a uniform cross-section throughout of magnetic material.

With the coil 5 having a plurality of turns as indicated, the magneto-motive-force exerted upon the magnetic circuit of the instrument will be proportional to the current flowing multiplied by the number of turns of the coil. A relatively small current therefore such as would ordinarily be found in the circuits of dry cells, lamps, horns and the generator circuits of automobiles, can be made to have sufficient magneto-motive-force to afford extensive and therefore accurately observable indications. For ordinary purposes this would be from zero to 20 amperes as shown on the dial in Fig. 1 of the drawing, the instrument operating in either direction from a central zero position so that when connected in the storage battery circuit charging or discharging current may be indicated.

When it is desired to test the storage batteries observation is made of the current which will flow on a short circuit. Accordingly the present instrument is adapted for such use by mounting a single straight conducting bar 50 in the wooden casing. The ends of the bar where they emerge from the sides of the wooden casing are secured in electrical contact with strips 51 and 52 which are respectively connected with stiff pointed contacts or prods 53 and 54 which are pivoted upon the screws 55 and 56 which secure them to the casing and in electrical contact with the strips 51 and 52. These contacts may be folded into position against the sides of the casing as indicated by full lines in Fig. 2 or may be extended by turning them about their pivotal points into the positions as indicated by dotted lines in that figure when they are in position for use. These stiff prods may be pushed forcibly against the leaden terminals of storage batteries so that good contact therewith is made, the prods 53 and 54 being of material such as copper which is harder than lead and they are sharpened at their outer extremities as shown so as to easily indent and contact with the leaden terminals.

The bar 50 is substantially parallel to the plane of the coil 5 so that lines of force set up by the current in it are substantially parallel to the lines of force set up by the coil 5 and so follow the path wherein the movable element of the indicator is acted upon as set forth in the foregoing description. Also it is to be observed that the conductor 50 is substantially perpendicular to a plane passed through the center of the coil 5 and the axis of the movable element of the meter and intersects that plane at a point between the axes of the coil and movable element. The conductor 50 operates as a single turn and is not so closely associated with the magnetic circuit of the movable element as is the coil 5. Consequently a given amount of current in the conductor 50 has less effect upon the movable element. Ordinarily in testing a battery the meter should have a capacity up to 2000 amperes. The desired movement of the movable element with relation to the current flowing in the conductor 50 may be accomplished by mounting that conductor in closer or more remote association with the magnetic circuit of the movable element.

It thus appears that the instrument may be connected in circuit by means of its terminals 3 and 4 when current will flow through the coil 5 and the instrument will be a high reading one for use in indicating small currents. When, however, it is desired to have the instrument low reading for measuring heavy currents connection is made to the terminals of the bar 50, the terminals 3 and 4 being disconnected. The connection of the bar 50 may be by means of pressing prods or other suitable connectors against the terminals between which it is desired to measure current, or connection with the ends of the bar might be made in any suitable way so as to place the bar in the circuit where it is desired to measure the current. In the instance shown the bar 50 is so related to the mechanism of the instrument that the needle will move but one hundredth as far per unit of current as it will when actuated by the coil 5. The scale shown therefore reads directly for indicating current through the coil 5 but the readings are to be multiplied by one hundred when current through the conductor 50 is being indicated, the instrument having in the one case a capacity of 20 amperes and in the other case a capacity of 2000 amperes.

Figure 6:
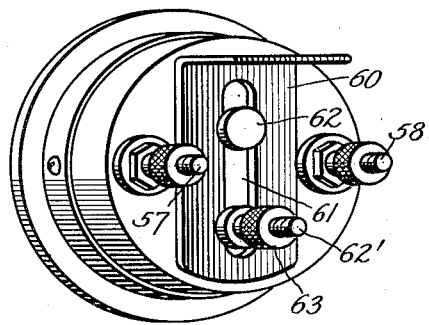
Fig. 6 is a perspective view of a modified form of instrument.
Figure 7:
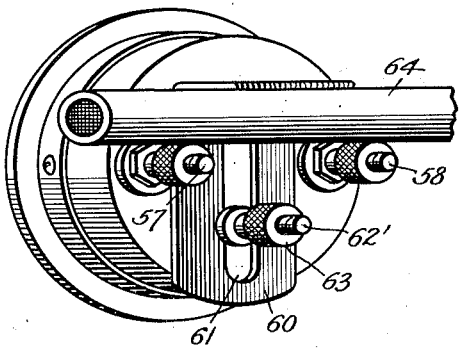
Fig. 7 is a similar view of the instrument of Fig. 6, but with a conductor, the current of which is to be measured, in position.

Referring now to Figs. 6 and 7, the instrument is the same as that shown and described in connection with Figs. 1 to 5 inclusive except that it has a metal case and the conductor 50 and its connections are omitted, and further that the terminals 57 and 58 of the coil 5 are brought out at the back of the casing similar to the terminals of the instrument in my prior application referred to, instead of at the bottom of the casing as in the apparatus of Figs. 1 to 5 hereof.

The instrument of Figs. 6 and 7 is provided with a clamp 60 having a slot 61 through which projects a pin having a head 62 beneath which the clamp may slide. Also projecting through the slot from the back of the instrument casing is a screw-threaded stud 62' upon which is the thumb-nut 63 which may be screwed down against the clamp 60 to secure it in position.

The conductor as 64, in which it is desired to measure the current, is placed against the terminals or studs 57 and 58, the clamp pressed against it and then secured in this position by screwing up the nut 63, the conductor being thus clamped between the clamp and the studs 57 and 58. The studs 57 and 58 being upon substantially a diameter of the coil 5, it will be seen that the conductor 64 is located at one side of the horizontal diameter of the coil 5 and, being outside the casing and also removed from the magnetic members of the instrument to a greater distance than the coil 5, a given amount of current in the conductor 64 has less effect upon the indicator. The indicator therefore is lower reading for current in the conductor 64 than for current in the coil 5. In connection with automobiles the instrument as shown in Figs. 6 and 7 would most likely be used in testing the starting circuit of the automobile and the like and for this purpose the instrument should have a capacity up to 500 amperes. The adjustment of the conductor 64 with relation to the magnetic circuit of the instrument is therefore such that the effect on the current in the conductor 64 in shifting the field of the terminal magnet will be one-twenty-fifth of the effect produced by the same amount of current if flowing in the coil 5 so that the reading on the instrument per unit of current flowing in the straight conductor will be one-twenty-fifth that produced by the coil. Accordingly the reading on the scale of the instrument shown should be multiplied by twenty-five when the straight conductor is the current carrying element.

When desired the clamp may be released and the instrument and conductor 64 separated. The instrument may then be connected in any desired circuit by means of its terminals 57 and 58.

Figure 8:
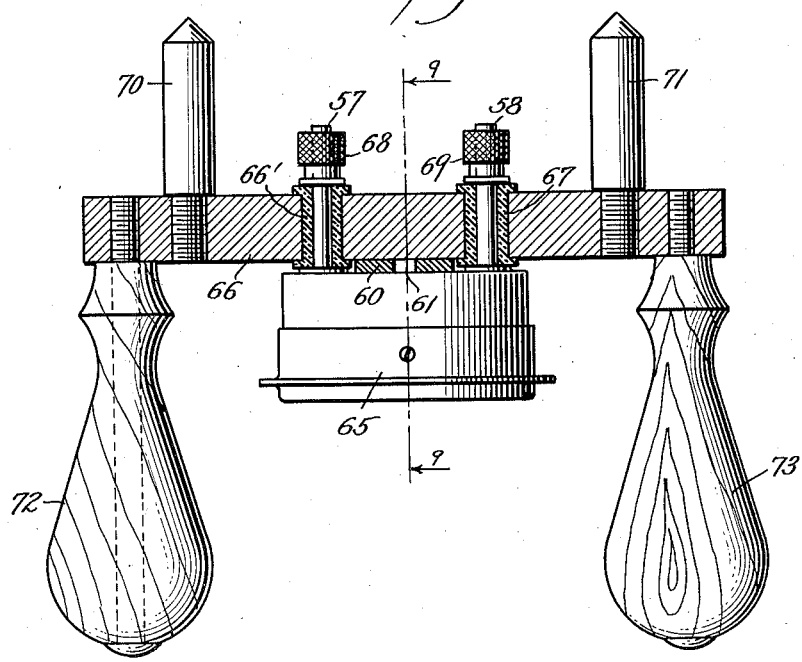
Fig. 8 is a view in side elevation of an instrument comprising a structure the same as shown in Figs. 6 and 7, in combination with a current carrying element and contacting devices, the latter being shown in longitudinal section.
Figure 5:
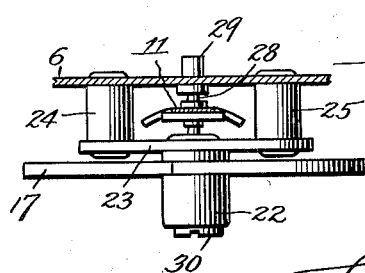
Fig. 5 is a fragmentary view showing in side elevation the ends of the horseshoe magnets on the instrument and adjacent parts.
Figure 9:
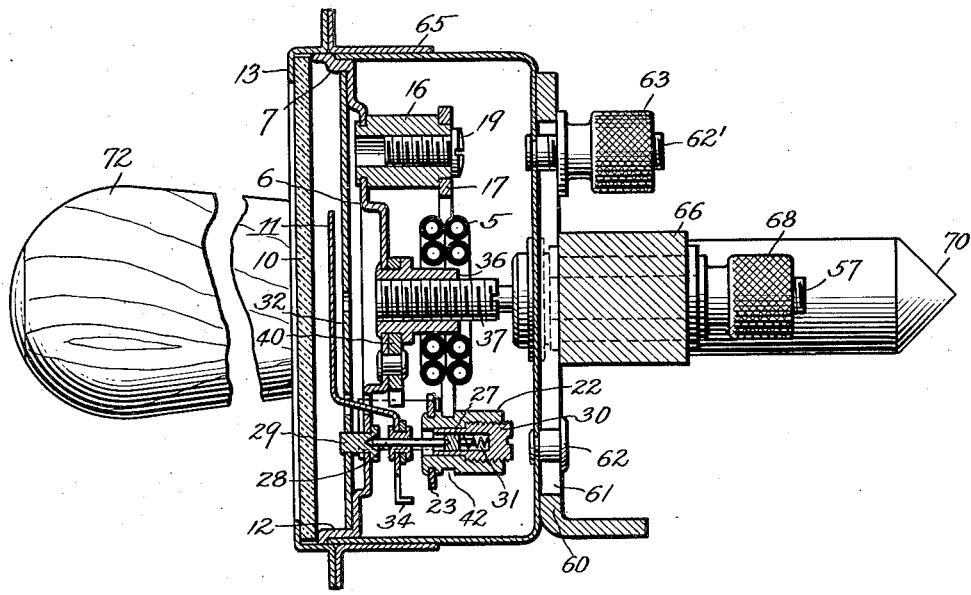
Fig. 9 is a section on the line 9—9 of Fig. 8.
Figure 10:
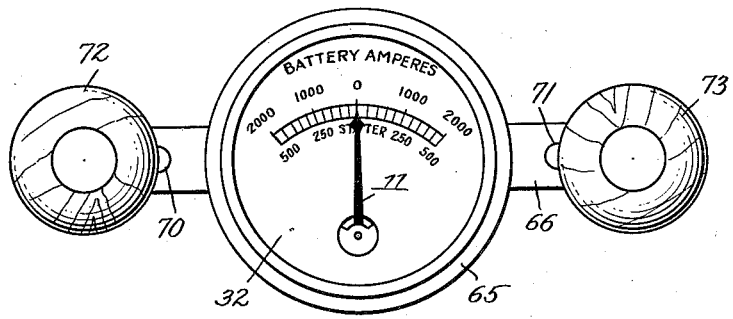
Fig. 10 is a plan view of the instrument shown in Fig. 8.

Referring now to Fig. 8 of the drawing, the device therein shown comprises an instrument 65, the same as that of Figs. 6 and 7. The clamp may or may not be removed as desired. The instrument is secured to a conducting bar 66 by having its coil terminals 57' and 58 passed through insulating bushings 66' and 67 in the bar and secured by the thumb nuts 68 and 69 as shown. Upon the opposite side of the bar from the instrument are pointed studs 70 and 71 which may be thrust and held against the points (as the leaden terminals of a storage battery) between which the current flow is desired. Upon the same side of the bar as the instrument project two handles 72 and 73 which are of aid in firmly holding the contacts against the terminals, one being taken in each hand.

The bar 66 should have very low resistance for making the short circuit test on batteries. In most cases satisfactory results will be obtained if the bar resistance from contact point to contact point is approximately one twentieth of the normal internal resistance of the battery with which it is to be employed. By keeping the bar resistance low compared with the internal resistance of the battery, changes in ampere values are substantially a direct indication of changes in internal resistance of the battery and the temperature coefficient of the metal forming the contacts and bar will have practically no influence on the current flow. Also as the resistance of the contacts and bar is reduced further and further below the internal resistance of the battery, the loss of energy external to the battery is reduced and as it becomes very low substantially all of the energy dissipated by the short circuit current will be that due to the internal resistance of the battery. For use in a short circuit test as described, the instrument should ordinarily read up to two thousand amperes and so the bar 66 should be so related to the instrument that a given current in the bar will only have the effect of deflecting the movable element one one-hundredth as much as if the same current traversed the coil connected to the terminals 57 and 58 so that the scale readings should be multiplied by one hundred. This has been fully elucidated in connection with the devices of the preceding figures.

It will be observed that when the contacts 70 and 71 are pressed against the battery terminals a closed loop will be formed through the bar 66 and the meter should be on the outside of the bar so as to be outside of the loop. Otherwise the meter will not give accurate readings unless it is held perfectly vertical, deviation from this position resulting in changes in readings. With the instrument outside of the loop, however, it is not necessary to be so careful in positioning the instrument. The instrument may be caused to be outside the loop by mounting it on the opposite side of the bar 66 from the contacts 70 and 71 as shown.

While means have been shown for carrying out the invention and precise details of one manner of carrying it out have been recited, these details may be varied and the invention may be carried out by other means without departing from the spirit of the invention. The invention is not therefore limited to the precise details as recited nor to the means for practising it shown in the drawings.

What I claim is:

1. The method of testing the condition of charge of a storage battery which consists in passing current from one terminal to the other of said battery through a resistance less than the normal internal resistance of said battery and noting the effect of the current flowing between said terminals.

2. The method of testing the condition of charge of a storage battery which consists in passing current from one terminal to the other of said battery through a resistance less than the normal internal resistance of said battery and observing the amperes of said current.

3. The method of testing the condition of charge of a storage battery which consists in passing current from one terminal to the other of said battery through a resistance negligible with relation to the normal internal resistance of said battery, whereby the current flow is substantially proportional to the internal resistance of the battery, and observing the current flowing.

4. The method of testing the condition of a storage battery which consists in passing current from one terminal of the battery to the other through a connection extending from one of said terminals to the other external to the battery, the resistance of said connection being substantially negligible in comparison with the internal resistance of the battery, whereby the energy dissipated in the circuit including the battery and connection, is substantially all dissipated in the battery and substantially none is dissipated in the said external circuit, and noting the current flowing in the circuit.

5. The method of testing the condition of a storage battery which consists in passing current from one terminal of the battery to the other through a connection external to the battery extending from one of said terminals to the other, the internal resistance of said battery being much greater than the resistance of said connection whereby the energy dissipated within the battery is much greater than that dissipated in said connection, and noting the current flowing in the circuit.

6. The method of testing the condition of a storage battery which consists in passing current through the battery and an external connection extending from one terminal of the battery to the other, dissipating substantially all of the energy of said current in said battery, a negligible amount being dissipated in said connection, and observing the amount of said current.

7. The method of testing the condition of a storage battery which consists in passing current through the battery and an external connection extending from one terminal of the battery to the other, the greater part of the energy dissipated in the circuit containing said battery and connection being dissipated in the battery rather than in the said connection, and observing the amount of said current.

In testimony whereof I hereunto affix my signature.

HARRY I. SHIRE.